J. L. CREVELING.
ELECTRIC REGULATION.
APPLICATION FILED FEB. 7, 1912.
1,082,110.
Patented Dec. 23, 1913.
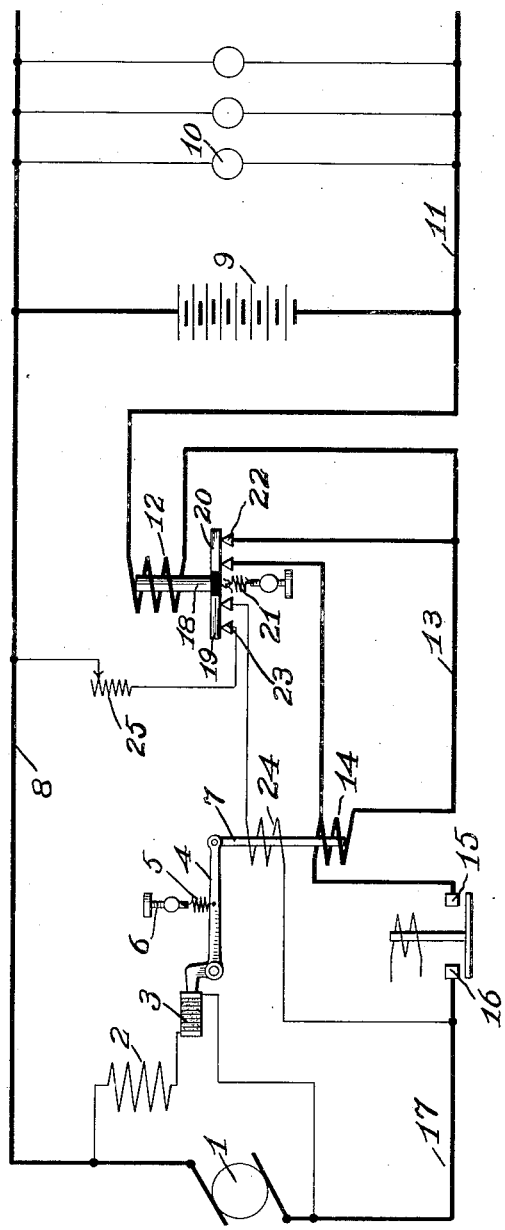
WITNESSES
H. Crocheron
Anna M. Wall
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,082,110. Specification of Letters Patent. Patented Dec. 23, 1913.

Application filed February 7, 1912. Serial No. 675,938.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate a dynamo or generator in a predetermined manner.

As my invention is particularly applicable to systems of electric distribution wherein a generator driven at variable speeds is used to charge a storage battery and operate lamps or other translating devices, it will be described with reference to such a system.

The drawing is a diagrammatic representation of one type of system embodying the essentials of my invention.

In the drawing 1 represents a dynamo or generator provided with the usual field coil 2 having in series therewith a regulating element 3, in this instance shown as a carbon pile resistance.

4 is a lever normally drawn in an upward direction as by the spring 5 adjustable as by the screw 6, the said spring 5 tending to compress the carbons 3 and lower the resistance thereof.

7 is a core of magnetic material carried by the lever 4 and thus it will be obvious that motion imparted to the said core may regulate the generator.

8 is the positive lead of the generator and is carried to the positive side of the storage battery 9 and lamps or other translating devices indicated at 10. The negative terminals of the translating devices 10 and storage battery 9 are connected with the wire 11 which is carried to one terminal of the solenoid 12, the opposite terminal of which is carried as by the wire 13 to one terminal of the solenoid 14, the other terminal of which is connected with the contact member 15 of an automatic switch, the opposite contact member 16 of which is connected as by the lead 17 with the negative side of the generator 1. The automatic switch is preferably one adapted to open and close a generator circuit when the voltage of the generator is very close to that of the battery and, as numerous automatic switches for this purpose are well known in the art, the presence of one of the well known variety is indicated diagrammatically merely.

18 is a core of magnetic material so disposed with regards the solenoid 12 that energization of the same tends to lift the said core.

19 and 20 are contact members carried by the core 18 and insulated therefrom as indicated. The adjustable spring 21 normally tends to draw the core 18 and members 19 and 20 downwardly and to cause electrical communication between the contact members 23 through the contact member 19 and between the contact members 22 through the member 20. The members 23 are in series with the solenoid 24 surrounding the core 7 and having in series therewith the adjustable resistance 25, the said solenoid 24 being connected across the generator mains through the contact members 23 and adjustable resistance 25.

An operation of my invention is substantially as follows: If the generator be running and its voltage be below that of the battery, the automatic switch indicated diagrammatically in the drawing will be open and the lamps or translating devices may be fed by the battery 9. Under these conditions, current from the generator will flow through the coil 2 and resistance 3 and cause the generator to build up upon increases in speed in a well known manner and current will flow through the coil 24 as the contacts 23 will be connected by the member 19 and the current in the coil 24 will tend to draw the core 7 downwardly against the action of spring 5 and increase the resistance 3. If now the generator speed and consequent voltage be raised to that slightly in excess of the battery, the switch will close and current will flow from the generator to the battery or translating devices 10 and return through main 11, coil 12 to wire 13 and an insignificant portion of the current may pass through the coil 14 and substantially all of the current will pass through the contact 20—22 establishing the shunt around the coil 14. The current from the said shunt and said coil will pass through the switch to the lead 17 and return to the generator. As the coil 14 is shunted out or short-circuited, its effect will be substantially *nil* and its regulating effect upon the generator may be caused to be *nil*, considered from a practical or operating standpoint. If the speed of the generator be now increased until its voltage is the maximum desired to have impressed upon the storage battery and generator circuit, I so adjust the spring 5 and the resistance 25 that any appreciable increase in voltage above this limit will cause the core 7 to be drawn downwardly in such manner as to increase the resistance 3 and hold the desired maximum voltage from being exceeded. If this voltage, which is not to be exceeded by the generator, produces a greater current output than is desired, I so adjust the spring 21 that any increase above the desired maximum output will cause the solenoid 12 to lift the core 18 and break the contacts at 23 and 22. The breaking of the contacts at 23 will render the coil 24 inoperative and the breaking of the contacts at 22 will open the shunt around the coil 14 and cause the generator current to pass through said coil in such manner that the generator is now current regulated instead of voltage regulated as before and the desired maximum current output of the generator through the coil 14 will not be exceeded, no matter how low a voltage is necessary to cause this output. If now for any cause the current in the coil 12 shall fall to a minimum amount, which may be readily adjusted, the spring 21 will cause the contacts 23 and 22 to be reconnected and the generator will be voltage regulated as before.

From the foregoing it will be obvious that I have produced a system wherein the generator is voltage regulated unless the desired voltage will cause too great a current to be delivered and then the generator regulator is automatically shifted to become a current regulator instead of a voltage regulator.

I do not wish in any way to limit myself to the exact details or mode of operation set forth in this specification for it will be obvious that wide departure may be made in the way of details without departing from the spirit and scope of my invention which is as set forth in the following claims:

I claim—

1. The combination with a generator, of means for regulating the same, operating means for controlling said regulating means responsive to voltage fluctuations and to current fluctuations and current responsive means for determining whether the voltage fluctuations or the current fluctuations shall actuate the operating means.

2. The combination with a generator, of regulating means therefor, voltage responsive and current responsive operating means for said regulating means, and current responsive means for determining the mode of action of the operating means.

3. The combination with a generator, of means for regulating the same, operating means for the regulating means responsive to voltage fluctuations and to current fluctuations and means whereby the current supplied by the generator determines whether the voltage fluctuations or the current fluctuations shall regulate the generator.

4. The combination with a generator, of means for regulating the same, operating means for the regulating means responsive to voltage fluctuations and to current fluctuations and means whereby the current supplied by the generator renders one kind of said fluctuations operative and the other inoperative.

5. The combination with a generator, of means for regulating the same, operating means controlling the regulating means responsive to voltage fluctuations and to current fluctuations, means whereby the operating means is rendered responsive to one kind of fluctuations or the other and current controlled means for governing the same.

6. The combination with a generator and means for regulating the same, of means for operating the regulating means responsive to voltage fluctuations and to current fluctuations and current controlled means affecting said operating means.

7. The combination with a generator, of means for regulating the same, controlling means therefor comprising a coil responsive to voltage fluctuations and a coil responsive to current fluctuations and automatic means responsive to current fluctuations for controlling the operation of said coils.

8. The combination with a generator, of means for controlling the same, regulating means therefor comprising a coil responsive to voltage fluctuations and a coil responsive to current fluctuations and automatic means responsive to current fluctuations for rendering one of said coils operative and the other inoperative.

9. The combination with a generator, of means for regulating the same, controlling means therefor comprising a coil responsive to voltage fluctuations and a coil responsive to current fluctuations and automatic means responsive to current fluctuations for determining which of said coils shall regulate the generator.

10. The combination with a generator and a circuit fed thereby, of means for regulating the generator, means for operating said regulating means responsive to voltage fluctuations across said circuit and to current fluctuations in said circuit and means for controlling the operating means responsive to current fluctuations in said circuit.

11. The combination with a generator, of a regulator therefor comprising operating means comprehending a coil in shunt to said generator, a coil in series with said generator and means for controlling the operativeness of said coils responsive to current fluctuations.

12. The combination with a generator having a field circuit and a circuit fed by said generator, of means for controlling the generator comprehending a regulating means in the field circuit, means for affecting said regulating means responsive to voltage fluctuations, means for affecting said regulating means responsive to current fluctuations and means for determining which of said affecting means shall be effective in the operation of the regulating means responsive to current fluctuations in a circuit supplied by the generator.

JOHN L. CREVELING.

Witnesses:
ANNA M. WALL,
M. HERSKOVITZ.